(12) United States Patent
Wang (10) Patent No.: US 10,929,610 B2
(45) Date of Patent: Feb. 23, 2021

(54) SENTENCE-MEANING RECOGNITION METHOD, SENTENCE-MEANING RECOGNITION DEVICE, SENTENCE-MEANING RECOGNITION APPARATUS AND STORAGE MEDIUM

(71) Applicant: BOE TECHNOLOGY GROUP CO., LTD., Beijing (CN)

(72) Inventor: Xiang Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 320 days.

(21) Appl. No.: 16/180,302

(22) Filed: Nov. 5, 2018

(65) Prior Publication Data

US 2019/0294674 A1    Sep. 26, 2019

(30) Foreign Application Priority Data

Mar. 20, 2018   (CN) .......................... 2018 1 0228156

(51) Int. Cl.
| | | |
|---|---|---|
| *G06F 40/30* | (2020.01) | |
| *G10L 15/16* | (2006.01) | |
| *G10L 15/18* | (2013.01) | |
| *G10L 15/26* | (2006.01) | |

(52) U.S. Cl.
CPC .............. *G06F 40/30* (2020.01); *G10L 15/16* (2013.01); *G10L 15/1815* (2013.01); *G10L 15/26* (2013.01)

(58) Field of Classification Search
CPC ......... G06F 40/30; G10L 15/16; G10L 15/26; G06N 3/08

USPC .......................... 704/239, 248, 256, 246, 255
See application file for complete search history.

(56) References Cited

U.S. PATENT DOCUMENTS

| | | | | |
|---|---|---|---|---|
| 2004/0223197 | A1* | 11/2004 | Ohta ................... | G06K 9/00456 358/538 |
| 2010/0135578 | A1* | 6/2010 | Nakamura ............... | G06K 9/38 382/190 |
| 2013/0262641 | A1* | 10/2013 | Zur ........................ | G06Q 10/10 709/223 |

(Continued)

*Primary Examiner* — Akwasi M Sarpong
(74) *Attorney, Agent, or Firm* — Nath, Goldberg & Meyer; Joshua B. Goldberg (57) ABSTRACT

The present disclosure provides a sentence-meaning recognition method, a sentence-meaning recognition apparatus, a sentence-meaning recognition equipment and a storage medium. The sentence-meaning recognition method includes: performing a character-based similarity calculation on a first sentence to be recognized and a second sentence obtained based on the first sentence to obtain a first similarity and a first sentence-meaning recognition result; determining whether the first similarity triggers an enhanced recognition according to an enhanced recognition condition; outputting the first sentence-meaning recognition result in a case where the enhanced recognition condition is not satisfied; in a case where the enhanced recognition condition is satisfied, performing a Chinese-phonetic-alphabet-based similarity calculation on the first sentence and the second sentence to obtain a second similarity and a second sentence-meaning recognition result, and generating and outputting a third sentence-meaning recognition result according to the first sentence-meaning recognition result and the second sentence-meaning recognition result.

24 Claims, 8 Drawing Sheets

(56) References Cited

U.S. PATENT DOCUMENTS

| | | | |
|---|---|---|---|
| 2014/0052436 A1* | 2/2014 | Qian | G06F 40/129 |
| | | | 704/9 |
| 2016/0293184 A1* | 10/2016 | Li | G06F 16/433 |
| 2017/0186338 A1* | 6/2017 | Treves | G09B 7/02 |
| 2017/0200458 A1* | 7/2017 | Kang | G10L 25/87 |
| 2017/0365258 A1* | 12/2017 | Cho | G10L 15/10 |

* cited by examiner

SENTENCE-MEANING RECOGNITION METHOD, SENTENCE-MEANING RECOGNITION DEVICE, SENTENCE-MEANING RECOGNITION APPARATUS AND STORAGE MEDIUM

CROSS-REFERENCE TO RELATED APPLICATION

The present disclosure claims priority to the application No. 201810228156.3, entitled "sentence-meaning recognition method, sentence-meaning recognition device, sentence-meaning recognition apparatus and storage medium", filed on Mar. 20, 2018, the entire disclosure of which is hereby incorporated by reference.

TECHNICAL FIELD

The present disclosure relates to the field of natural language processing technologies, and in particular, to a sentence-meaning recognition method, a sentence-meaning recognition device, a sentence-meaning recognition apparatus and a storage medium.

BACKGROUND

Sentence-meaning recognition is used to judge a user's intention by analyzing a sentence (such as an interrogative sentence), which is a premise of understanding the user's intention. The application scenarios of the sentence-meaning recognition mainly include a customer service robot, a question answering system and a human-machine interaction system.

SUMMARY

An embodiment of the present disclosure provides a sentence-meaning recognition method including: performing a character-based similarity calculation on a first sentence to be recognized and a second sentence obtained based on the first sentence to obtain a first similarity and a first sentence-meaning recognition result; determining whether the first similarity triggers an enhanced recognition according to an enhanced recognition condition; outputting the first sentence-meaning recognition result in a case where the enhanced recognition condition is not satisfied; and in a case where the enhanced recognition condition is satisfied, performing a Chinese-phonetic-alphabet-based similarity calculation on the first sentence and the second sentence to obtain a second similarity and a second sentence-meaning recognition result; and generating and outputting a third sentence-meaning recognition result according to the first sentence-meaning recognition result and the second sentence-meaning recognition result.

In some implementations of the present disclosure, the enhanced recognition condition includes the first similarity being less than a first threshold and greater than a second threshold; in a case where the first similarity is not greater than the second threshold, the first sentence-meaning recognition result is null.

In some implementations of the present disclosure, the step of performing the character-based similarity calculation on the first sentence to be recognized and the second sentence obtained based on the first sentence to obtain the first similarity and the first sentence-meaning recognition result includes: performing a character-vectorization processing on the first sentence and the second sentence respectively, and extracting features from the vectorized first sentence and the vectorized second sentence by using a first deep learning model to obtain a first extraction result and a second extraction result; performing a similarity calculation on the first extraction result and the second extraction result to obtain the first similarity; and generating the first sentence-meaning recognition result according to the first similarity.

In some implementations of the present disclosure, the step of performing the similarity calculation on the first extraction result and the second extraction result to obtain the first similarity includes: performing a similarity calculation on each of second extraction results extracted from multiple second sentences and the first extraction result respectively, to obtain a plurality of candidate similarities; and determining the highest candidate similarity among the candidate similarities as the first similarity.

In some implementations of the present disclosure, the step of performing Chinese-phonetic-alphabet-based similarity calculation on the first sentence and the second sentence, to obtain the second similarity and the second sentence-meaning recognition result includes: converting the first sentence and the second sentence into Chinese-phonetic-alphabets and performing a vectorization processing on the obtained Chinese-phonetic-alphabets, respectively, and performing feature extraction on the vectorized Chinese-phonetic-alphabets by using a second deep learning model to obtain a third extraction result and a fourth extraction result; performing a similarity calculation on the third extraction result and the fourth extraction result to obtain the second similarity; and generating the second sentence-meaning recognition result according to the second similarity.

In some implementations of the present disclosure, the step of converting the first sentence and the second sentence into Chinese-phonetic-alphabets and performing the vectorization processing on the obtained Chinese-phonetic-alphabets includes: converting the first sentence and the second sentence into Chinese-phonetic-alphabets; dividing the Chinese-phonetic-alphabets of the first sentence and the second sentence into groups on the basis of the Chinese-phonetic-alphabets of each character and dividing the Chinese-phonetic-alphabets of the first sentence and the second sentence into groups on the basis of a window with a fixed length; vectorizing the Chinese-phonetic-alphabets of each group.

In some implementations of the present disclosure, the step of generating and outputting the third sentence-meaning recognition result according to the first sentence-meaning recognition result and the second sentence-meaning recognition result includes: determining whether the first sentence-meaning recognition result and the second sentence meaning recognition result are the same; in a case where the first sentence-meaning recognition result and the second sentence meaning recognition result are not the same, the third sentence-meaning recognition result is configured to be null and is output; in a case where the first sentence-meaning recognition result and the second sentence meaning recognition result are the same, the first sentence-meaning recognition result is output as the third sentence meaning recognition result.

In some implementations of the present disclosure, the sentence-meaning recognition method further includes a step of performing a voice recognition on voice information to obtain the first sentence.

In some implementations of the present disclosure, the sentence-meaning recognition method further includes:

before the step of performing the voice recognition on the voice information to obtain the first sentence, collecting the voice information.

In some implementations of the present disclosure, the second sentence is obtained from a segmentation domain library based on the first sentence.

An embodiment of the present disclosure further provides a sentence-meaning recognition apparatus including: a first recognition device configured to perform a character-based similarity calculation on a first sentence to be recognized and a second sentence obtained based on the first sentence to obtain a first similarity and a first sentence-meaning recognition result; a determining device configured to determine whether the first similarity triggers an enhanced recognition according to an enhanced recognition condition; a first output device configured to output the first sentence-meaning recognition result in a case where the determination result is that the enhanced recognition is triggered; a second recognition device configured to, in a case where the determination result is that the enhanced recognition is triggered, perform a Chinese-phonetic-alphabet-based similarity calculation on the first sentence and the second sentence to obtain a second similarity and a second sentence-meaning recognition result; and a second output device configured to generate and output a third sentence-meaning recognition result according to the first sentence-meaning recognition result and the second sentence-meaning recognition result.

In some implementations of the present disclosure, the second recognition device includes: an extraction element configured to convert the first sentence and the second sentence into Chinese-phonetic-alphabets and perform a vectorization processing on the obtained Chinese-phonetic-alphabets, respectively, and perform feature extraction on the vectorized Chinese-phonetic-alphabets by using a second deep learning model to obtain a third extraction result and a fourth extraction result; a calculation element configured to perform a similarity calculation on the third extraction result and the fourth extraction result to obtain the second similarity; and a generation element configured to generate the second sentence-meaning recognition result according to the second similarity.

In some implementations of the present disclosure, the extraction element is further configure to: convert the first sentence and the second sentence into Chinese-phonetic-alphabets; divide the Chinese-phonetic-alphabets of the first sentence and the second sentence into groups on the basis of the Chinese-phonetic-alphabet of each character, and divide the Chinese-phonetic-alphabets of the first sentence and the second sentence into groups on the basis of a window with a fixed length; and vectorize the Chinese-phonetic-alphabets of each group.

In some implementations of the present disclosure, the enhanced recognition condition includes the first similarity being less than a first threshold and greater than a second threshold; in a case where the first similarity is not greater than the second threshold, the first sentence-meaning recognition result is null.

In some implementations of the present disclosure, the sentence-meaning recognition apparatus further includes a voice recognition device configured to perform a voice recognition on voice information to obtain the first sentence.

In some implementations of the present disclosure, the sentence-meaning recognition apparatus further includes a collection device configured to collect the voice information.

In some implementations of the present disclosure, the sentence-meaning recognition apparatus further includes a storage device configured to store a segmentation domain library, wherein the second sentence is obtained from a segmentation domain library based on the first sentence.

An embodiment of the present disclosure further provides a sentence-meaning recognition equipment including: one or more processors; and a memory configured to store one or more programs, the one or more processors perform the sentence-meaning recognition method as above when the one or more programs are executed by the one or more processors.

An embodiment of the present disclosure further provides a storage medium storing a computer program, the program is executed to implement the sentence-meaning recognition method as above.

BRIEF DESCRIPTION OF THE DRAWINGS

Other features, objects, and advantages of the present disclosure will become more apparent from the detailed description of unlimited embodiments with reference to the accompanying drawings.

DETAILED DESCRIPTION

The present disclosure will be further described in detail below in conjunction with the accompanying drawings and embodiments. It should be understood that the specific embodiments described herein are merely used to explain the disclosure, rather than limiting the disclosure. It should also be noted that, for the convenience of description, only parts related to the disclosure are shown in the drawings.

It should be noted that the embodiments in the present disclosure and features in the embodiments may be combined with each other without conflict. The present disclosure will be described in detail below with reference to the drawings and embodiments.

Input of sentence-meaning recognition is usually derived from a textual result obtained by a voice recognition. A conventional voice recognition algorithm often causes mistaken recognition, which leads to unable to effectively recognize the user's intention and the user's experience is bad. For example, for question and answer in the field of calligraphy and painting, when an existing sentence-meaning recognition method is used to recognize a common question "这是什么画", in a case where it is recognized as "这是什么话" by a voice recognition and is converted into a textual result as the input of sentence-meaning recognition, a mistaken recognition may occur. It is difficult for the existing sentence-meaning recognition method to solve the problem of mistaken recognition in the segmentation domain.

Figure 1:
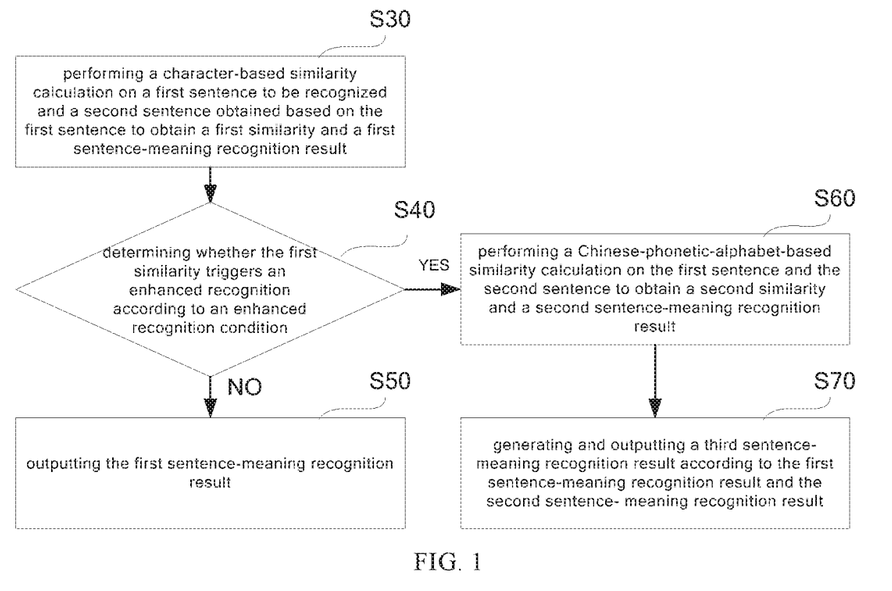
FIG. 1 is a flowchart of a sentence-meaning recognition method according to an embodiment of the present disclosure.

FIG. 1 is a flowchart of a sentence-meaning recognition method according to an embodiment of the present disclosure.

As shown in FIG. 1, in an embodiment of the present disclosure, a sentence-meaning recognition method is provided, including step S30 to step S70, At the step S30, performing a character-based similarity calculation on a first sentence to be recognized and a second sentence obtained based on the first sentence to obtain a first similarity and a first sentence-meaning recognition result.

At the step S40, determining whether the first similarity triggers an enhanced recognition according to an enhanced recognition condition.

If the determination result is "NO", the process proceeds to step S50. At the step S50, outputting the first sentence-meaning recognition result.

If the determination result is "YES", the process proceeds to step S60. At the step S60, performing a Chinese-phonetic-alphabet-based similarity calculation on the first sentence and the second sentence to obtain a second similarity and a second sentence-meaning recognition result.

At the step S70, generating and outputting a third sentence-meaning recognition result according to the first sentence-meaning recognition result and the second sentence-meaning recognition result.

In an embodiment of the present disclosure, the first sentence is textual information obtained by performing voice recognition on the voice information. In other embodiments, the first sentence may also be configured as textual information from various sources, for example, it may be input and transmitted by the user via a communication tool. For the textual information from other sources, the solution provided by the present disclosure can accurately recognize sentence-meaning of erroneous input of homophones and achieve a same technical effect.

Specifically, in an embodiment of the present disclosure, the voice information of the user is collected by using any voice collecting terminal such as a mobile phone or a microphone, and then a voice recognition is performed on the voice information by the mobile phone or an intelligent terminal communicatably connected to the microphone (the voice information may also be directly transmitted to a server to be recognized), to obtain the first sentence and send it to a remote server, so that the server can execute the above method shown in FIG. 1, and then the server transmits the output sentence-meaning recognition result to an application terminal or an application server so as to further provide related services to the user by using the sentence-meaning recognition result. In other embodiments, the above method may also be configured to be directly executed by a smart terminal such as a mobile phone, or by a different apparatus such as a sentence-meaning recognition apparatus dedicated to sentence-meaning recognition, and a same technical effect can be achieved.

The above method is explained in detail by an example.

The user asks by voice: "这是什么画", after the mobile phone collects the voice information, the mobile phone performs a voice recognition on the voice information, the first sentence "这是什么话" is obtained, and the first sentence is transmitted to the server.

After receiving the first sentence, the server executes the step S30 to obtain a plurality of second sentences such as "这是什么画", "这幅是什么画", "这是幅什么画", "这画是谁画的" from the painting and calligraphy segmentation domain library, and performs a character-based similarity calculation on the first sentence and each of the second sentences respectively. The similarity calculation can be performed by using any similarity algorithm commonly used in the art. In the present embodiment of the present disclosure, a deep learning model is used for the similarity calculation, and in other embodiments, other different model algorithms can be used, which will be introduced specifically below with reference to FIG. 2.

Figure 2:
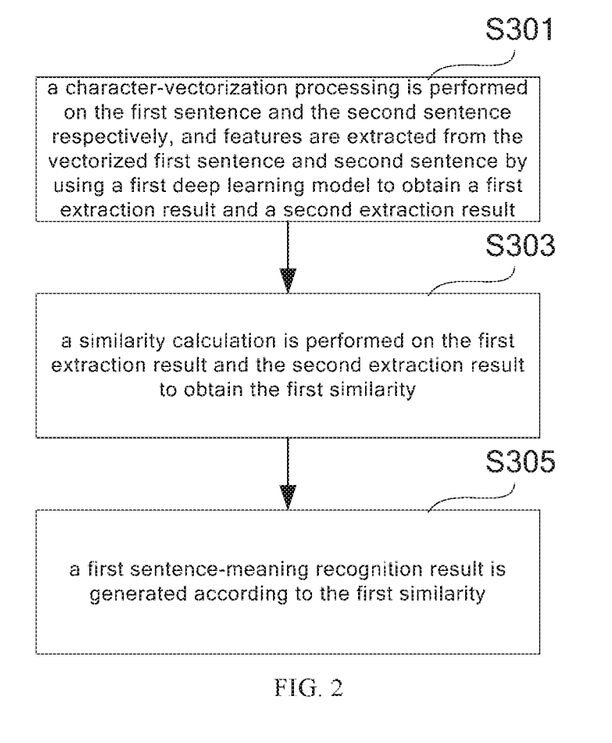
FIG. 2 is a flowchart of a step S30 in an implementation of the method of FIG. 1.

FIG. 2 is a flowchart of step S30 in an embodiment of the method of FIG. 1. As shown in FIG. 2, in an embodiment, the step S30 includes step S301, step S303 and step S305.

At the step S301, a character-vectorization processing is performed on the first sentence and the second sentence respectively, and features are extracted from the vectorized first sentence and the vectorized second sentence by using a first deep learning model to obtain a first extraction result and a second extraction result.

At the step S303, a similarity calculation is performed on the first extraction result and the second extraction result to obtain the first similarity.

At the step S305, a first sentence-meaning recognition result is generated according to the first similarity.

Specifically, at the step S301, the character-vectorization processing is performed on the first sentence and the second sentence respectively, and then the feature extraction is performed through a convolution layer of the first deep learning model, and a feature compression is performed through a maximum pooling layer of the first deep learning model to extract a main feature to obtain the first extraction result and the second extraction result, respectively. The first deep learning model is obtained by sample training of character vectors.

At the step S303, a similarity calculation is performed on the first extraction result and the second extraction result, and the first similarity is calculated, for example, a similarity between and "这是什么话" and "这是什么画" is 0.8, a similarity between "这是什么话" and "这幅是什么画" is 0.69, and so on, from which the highest similarity is selected as the first similarity. In other embodiments, a plurality of items with the highest similarity, for example, two or three items with the highest similarity, may be retained according to actual requirements, and then a comprehensive determination is performed after the subsequent Chinese-phonetic-alphabet-based enhanced recognition at the step S60.

At the step S305, the first sentence-meaning recognition result is generated according to the first similarity and a condition. For example, in an embodiment of the present disclosure, the condition is that the similarity being not less than 0.75 which represents that the recognition is successful, and the similarity of 0.8 satisfies the condition and the sentence-meaning recognition result is "这是什么画". For another example, in another embodiment, if the condition is that the similarity being not less than 0.85 which represents the recognition is successful, then similarity of 0.8 does not satisfy the condition, and the first sentence-meaning recognition result represents that the recognition is unsuccessful (that is, the first sentence-meaning recognition result is null).

At the step S40, it is determined whether the first similarity triggers an enhanced recognition based on an enhanced recognition condition.

In an embodiment of the present disclosure, the enhanced recognition condition is that the first similarity being less than a first threshold of 0.85 and greater than a second threshold of 0.75. That is, when the first similarity is not greater than the second threshold value of 0.75, the first sentence-meaning recognition result is null, and the process directly proceeds to the step S50, and "null" is output as the first sentence-meaning recognition result. When the first similarity is not less than 0.85, the process proceeds to the step S50 as well, and the first sentence-meaning recognition result representing that the recognition is successful is output. When the first similarity is less than the first threshold value of 0.85 and greater than the second threshold value of 0.75, a Chinese-phonetic-alphabet-based enhanced recognition is triggered, and the process proceeds to the step S60.

Values of the first threshold and the second threshold are only examples. In other embodiments, any value between 0 and 1 may be selected for the first threshold and the second threshold respectively, for example, the first threshold may be 0.9, the second threshold may be 0.6, and the first threshold may be 0.75, the second threshold may be 0.68, and so on. Moreover, values of the first threshold and the second threshold may not be limited within the range from 0 to 1 according to actually configured different algorithms. In an embodiment of the present disclosure, the enhanced recognition condition is a pre-configured condition, and in other embodiments, the enhanced recognition condition may be dynamically adjusted during the recognition process.

In another embodiment, the enhanced recognition condition may also be configured as that the first similarity is greater than the second threshold, that is, the Chinese-phonetic-alphabet-based enhanced recognition is performed on all the first sentence-meaning recognition results each representing that the recognition is successful.

At the step S60, similarly to the step S30, in an embodiment of the present disclosure, the deep learning model is also selected for similarity calculation. In other embodiments, other different model algorithms may also be adopted, which will be specifically described below with reference to FIG. 3.

Figure 3:
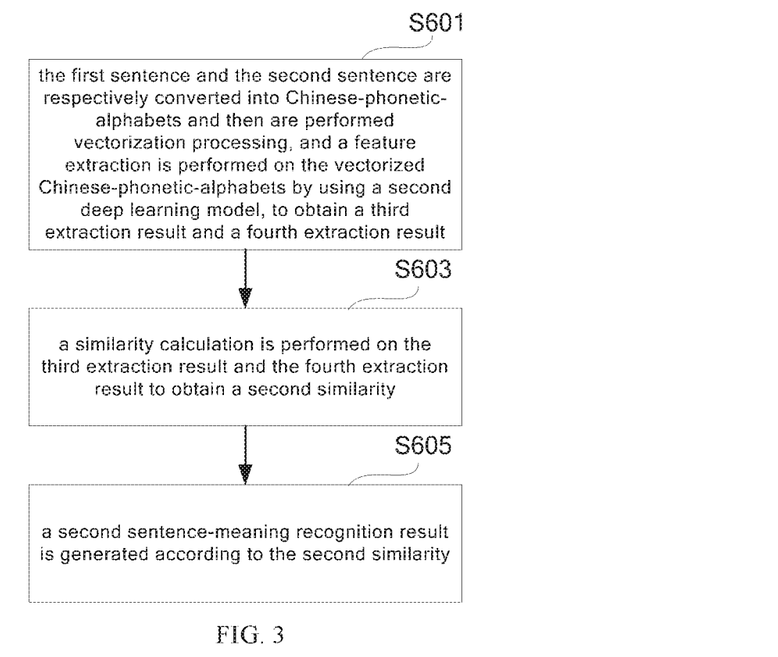
FIG. 3 is a flowchart of a step S60 in an implementation of the method of FIG. 1.

FIG. 3 is a flowchart of the step S60 in an implementation of the method of FIG. 1. As shown in FIG. 3, in an embodiment, the step S60 includes a step S601, a step S603 and a step S605.

In the step S601, the first sentence and the second sentence are respectively converted into Chinese-phonetic-alphabets and then vectorization processing is performed, and a feature extraction is performed on the vectorized Chinese-phonetic-alphabets by using a second deep learning model, to obtain a third extraction result and a fourth extraction result, At the step S603, a similarity calculation is performed on the third extraction result and the fourth extraction result to obtain a second similarity.

At the step S605, a second sentence-meaning recognition result is generated according to the second similarity.

Specifically, the method shown in FIG. 3 is different from the method shown in FIG. 2 in that, at the step S601, the first sentence and the second sentence are respectively converted into Chinese-phonetic-alphabets first, and then the a vectorization processing is performed on the Chinese-phonetic-alphabets, and the second deep learning model is obtained through a sample training of the Chinese-phonetic-alphabet vectors. In an embodiment of the present disclosure, the first deep learning model and the second deep learning model are models obtained based on a same training algorithm, and in other embodiments, the first deep learning model and the second deep learning model may also be obtained based on different training algorithms, and a same technical effect can be achieved.

For the first sentence "这是什么话" and the second sentence "这是什么画" exemplified as above, since their Chinese-phonetic-alphabets are completely the same, it is obvious that the second similarity calculated at the step S603 is very high, and the second sentence-meaning recognition result generated at the step S605 is also "这是什么画".

At the step S70, the first sentence-meaning recognition result is compared with the second sentence-meaning recognition result, if they are the same, the same sentence-meaning recognition result is output as a final third sentence-meaning recognition result, if they are different, a final third sentence-meaning recognition result is null. In the above example, both of the first sentence-meaning recognition result and the second sentence-meaning recognition result are "这是什么画", so the third sentence-meaning recognition result being final output is "这是什么画". An application terminal or an application server receiving the third sentence-meaning recognition result may perform related data query and display according to the third sentence-meaning recognition result for the user's referring, thereby realizing an accurate recognition in the field of painting and calligraphy in a case where "这是什么话" is mistaken recognized by a voice recognition, providing the user with a good user experience. In other embodiments, the step S70 may be further configured to output the first sentence-meaning recognition result and the second sentence meaning recognition result at the same time for the user's referring when the first sentence-meaning recognition result and the second sentence meaning recognition result are different.

In the above embodiment, the Chinese-phonetic-alphabet-based enhanced recognition is performed on the first sentence to be recognized on the base of a condition through configuring a segmentation domain library including a plurality of sentences in this segmentation domain, thereby realizing an accurate recognition in the segmentation domain for a sentence which may be mistakenly recognized by the voice recognition, providing the user with a good user experience.

Figure 4:
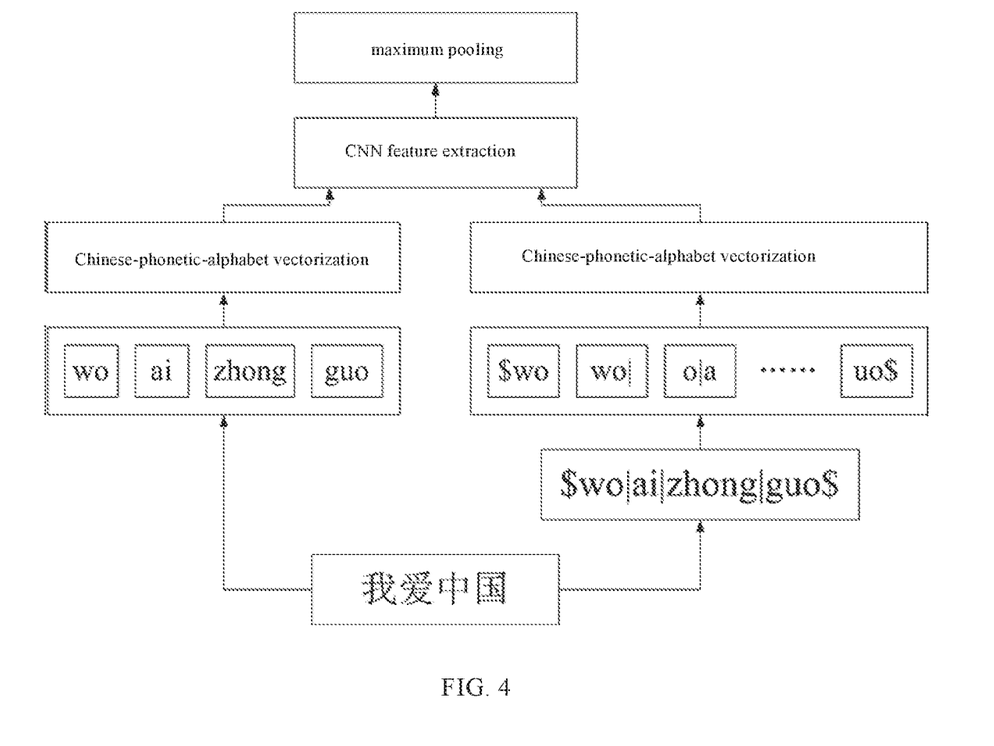
FIG. 4 is a flowchart of a Chinese-phonetic-alphabet vectorization and a process using a model in an implementation of the method of FIG. 1.

FIG. 4 shows flows of a Chinese-phonetic-alphabet vectorization and a process adopting a deep learning model in the manner shown in FIG. 1 by taking an input sentence "

我爱中国" as an example. It should be noted that, in the flow shown in FIG. 4, the deep learning model refers to the second deep learning model described above, specifically, it is a convolutional neural network model.

Referring to FIG. 4, in the illustrated process flow, the Chinese-phonetic-alphabet vectorization for "我爱中国" adopts a manner where combining grouping on the basis of the Chinese-phonetic-alphabet of each wordcharacter and grouping on the basis of a window with a fixed length. Grouping on the basis of the Chinese-phonetic-alphabet of each wordcharacter refers to dividing the Chinese-phonetic-alphabets corresponding to a same wordcharacter in the Chinese-phonetic-alphabets into a group and performing vectorization. Table 1 shows a vectorization result based on grouping on the basis of original character by taking the vectorization of the phrase "我爱中国" as an example. It should be noted that, in the embodiment, the sentence "我爱中国" includes four characters of "我", "爱", "中" and "国", that is to say, each of "我", "爱", "中", and "国" represents a character.

TABLE 1

|  | 1 | 2 | ... | d |
|---|---|---|---|---|
| wo | 0.53 | 0.26 | ... | 0.68 |
| ai | 0.51 | 0.13 | ... | 0.94 |
| zhong | 0.02 | 0.36 | ... | 0.28 |
| guo | 0.52 | 0.85 | ... | 0.45 |

According to the manner where grouping on the basis of a window having a fixed length, first, delimiters are added at beginning and end of a target sentence and between Chinese-phonetic-alphabets corresponding to different characters. Referring to FIG. 4, the delimiters added at the beginning and the end of the target sentence are "$", and the delimiter added between Chinese-phonetic-alphabets belonging to different characters is "|". After the delimiters are added, dividing the Chinese-phonetic-alphabet string into groups on the basis of a window with fixed length, and then a vectorization is further performed on the Chinese-phonetic-alphabets corresponding to the sentence. Table 2 shows the vectorization results by grouping on the basis of a window with the fixed length by taking the phrase "我爱中国" as an example. It can be seen that in the vectorization results shown in Table 2, the fixed length of the window is 3.

TABLE 2

|  | 1 | 2 | ... | d |
|---|---|---|---|---|
| $wo | 0.23 | 0.54 | ... | 0.82 |
| wo| | 0.21 | 0.05 | ... | 0.31 |
| ... | ... | ... | ... | ... |
| uo$ | 0.97 | 0.22 | ... | 0.20 |

Regardless of which of the two vectorization methods is adopted, a set of Chinese-phonetic-alphabets are vectorized into a set of numerical vectors each of which has a width of d. The vectors corresponding to different sets of Chinese-phonetic-alphabets are arranged longitudinally in sequence, forming a matrix that needs to be processed by the second deep learning model.

Since both of the processing results of the two vectorization methods are vectors each of which has a width of d, all vectors obtained by using different vectorization methods can be processed by the second deep learning model.

However, in the second deep learning model, processing methods for the vectors obtained by the two vectorization methods are slightly different, which is mainly reflected in that convolution kernels used by the convolutional layer are different when the convolutional layer processes the vectors. For the vectors obtained by the first vectorization method, that is, the vectors obtained by grouping on the basis of original characters, convolution kernels of 1×d, 2×d, 3×d and 4×d are used, for the vectors obtained by the second vectorization method, that is, the vectors obtained by grouping on the basis of a window with the fixed length, convolution kernels of 3×d, 4×d and 5×d are used, where d represents the width of the vector obtained by the vectorization process.

After a feature extraction operation of the convolutional layer, a pooling operation is performed on the features extracted by the convolution layer. In an embodiment of the present disclosure, the pooling operation performed on the extracted features is a maximum pooling operation.

It should be noted that, although only one convolutional layer and one pooling layer are shown in FIG. 4, the number of convolution layers and pooling layers used in the actual model may be plural. Also, in general, the number of convolutional layers is equal to the number of pooling layers. In a case where the number of the convolutional layers and the pooling layers are plural, each convolutional layer is connected to a corresponding pooling layer, and then the convolutional layers and the pooling layers are cascaded with each other respectively to form the second deep learning model.

Chinese-phonetic-alphabets conversion, vectorization processing and feature extraction on the first sentence and the second sentence are described above, and similarity calculation performed on the extraction results is similar to the similarity calculation performed on the characters, and will not be described herein.

Figure 5:
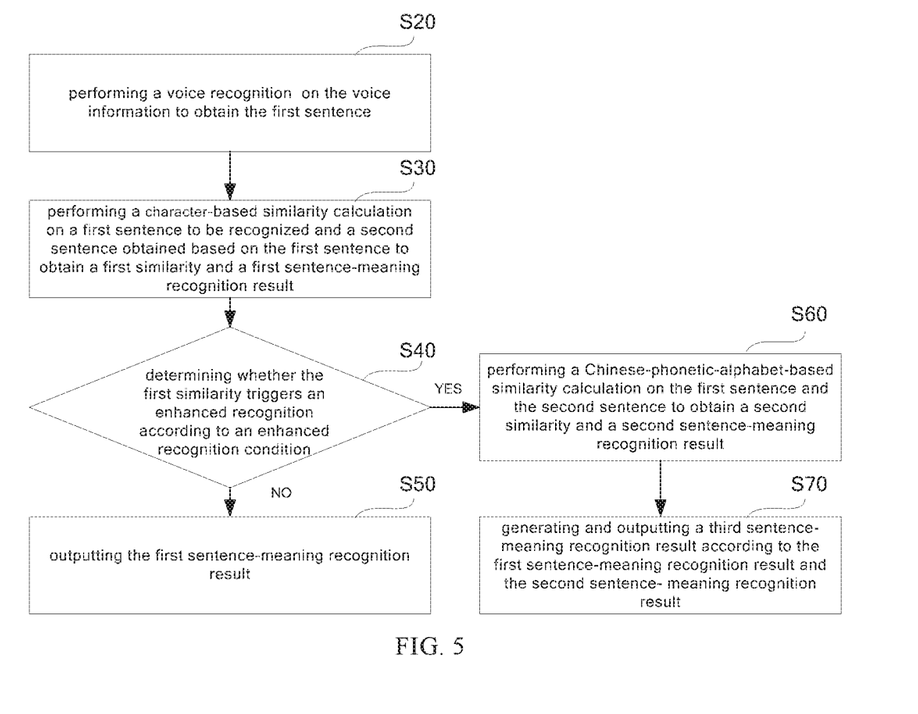
FIG. 5 is a flowchart of an implementation of the method of FIG. 1.

FIG. 5 is a flowchart of an embodiment of the method of FIG. 1. As shown in FIG. 5, in an embodiment, the method further includes a step S20.

At the step S20, a voice recognition is performed on the voice information to obtain the first sentence.

Specifically, the method shown in FIG. 5 differs from the method shown in FIG. 1 in that the voice recognition function is integrated therein without separately configuring a voice recognition device and performing data docking.

Figure 6:
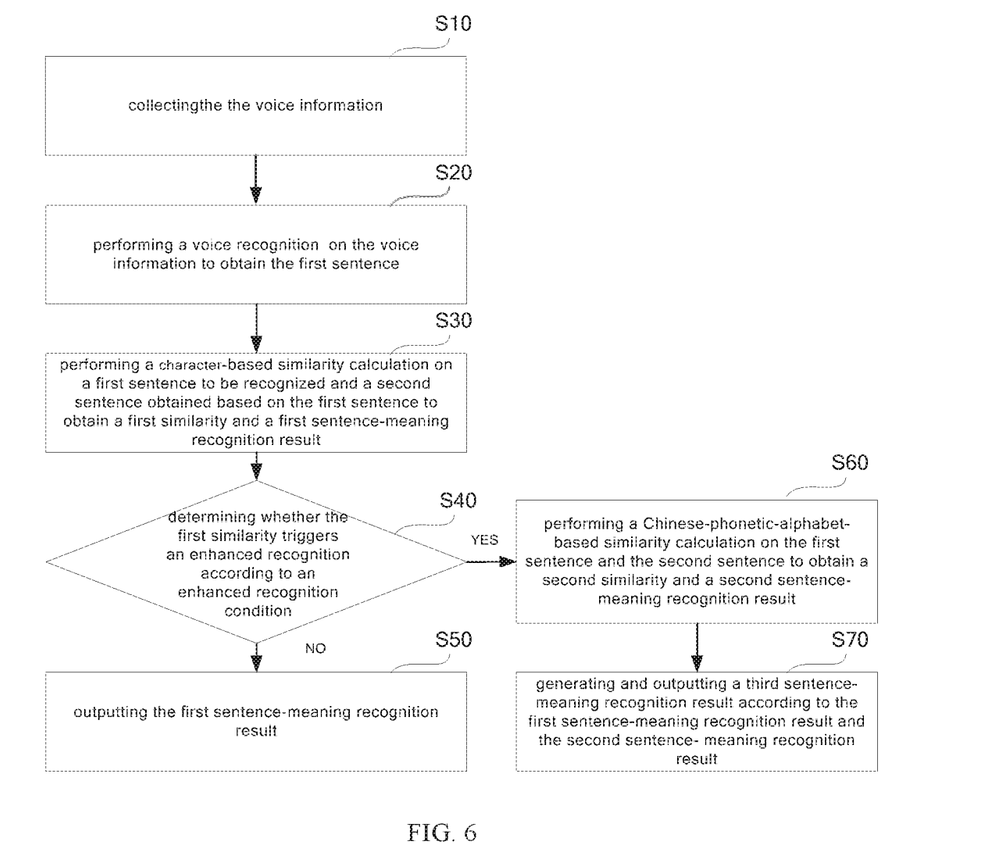
FIG. 6 is a flowchart of an implementation of the method of FIG. 4.

FIG. 6 is a flowchart of an implementation of the method of FIG. 5. As shown in FIG. 6, in an embodiment, the method further includes a step S10.

At the step S10, the voice information is collected.

Specifically, the method shown in FIG. 6 differs from the method shown in FIG. 5 in that a voice collection function is integrated therein without separately configuring a voice collection device and transmitting the voice information by communication.

Figure 7:
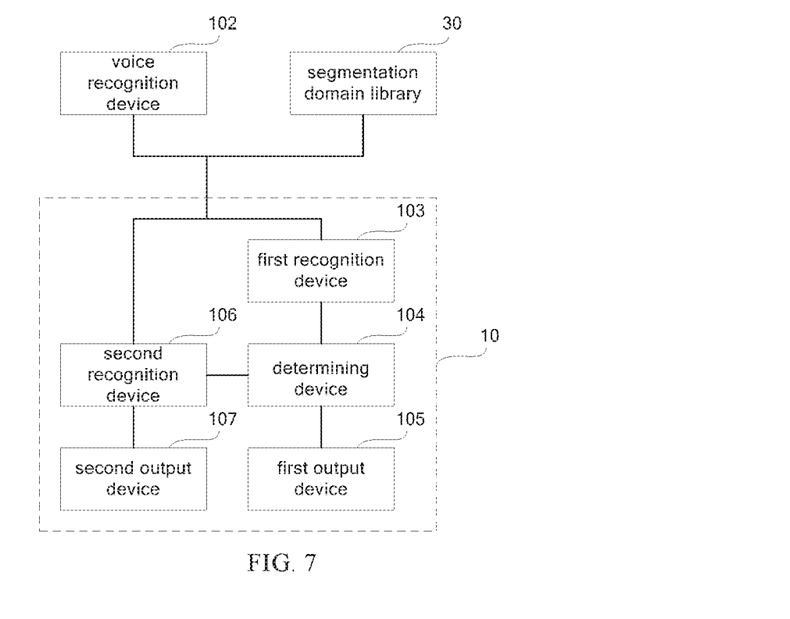
FIG. 7 is a schematic structural diagram of a sentence-meaning recognition apparatus according to an embodiment of the present disclosure.

FIG. 7 is a schematic structural diagram of a sentence-meaning recognition apparatus according to an embodiment of the present disclosure. The sentence-meaning recognition apparatus shown in FIG. 7 can correspondingly perform the method shown in FIG. 1. As shown in FIG. 7, an embodiment of the present disclosure provides a sentence-meaning recognition apparatus 10 including a first recognition device 103, a determining device 104, a first output device 105, a second recognition device 106 and a second output device 107.

The first recognition device 103 is configured to perform a character-based similarity calculation on a first sentence to be recognized and a second sentence obtained based on the first sentence, to obtain a first similarity and a first sentence-meaning recognition result.

The determining device 104 is configured to determine whether the first similarity triggers an enhanced recognition according to an enhanced recognition condition.

The first output device 105 is configured to output the first sentence-meaning recognition result in a case where the determination result is that the enhanced recognition is not triggered.

The second recognition device 106 is configured to, in a case where the enhanced recognition is triggered, perform a Chinese-phonetic-alphabet-based similarity calculation on the first sentence and the second sentence to obtain a second similarity and a second sentence-meaning recognition result.

The second output device 107 is configured to generate and output a third sentence-meaning recognition result according to the first sentence-meaning recognition result and the second sentence-meaning recognition result.

In an embodiment of the present disclosure, the first recognition device 103, the determining device 104, and the second recognition device 106 are embodied by CPU, and the first output device 105 and the second output device 107 are communication components connected to the CPU. In other embodiments, the above devices may be configured as a combination of other processors and communication components commonly used in the art according to actual needs, and a same technical effect can be achieved. The configuration environment of the above-mentioned sentence-meaning recognition device 10 may be referred to the method shown in FIG. 1, and can be configured in different configuration environments such as a smart terminal (e.g., a mobile phone), a remote server, and a dedicated sentence-meaning recognition device that is separately configured.

The principle of the sentence-meaning recognition of the sentence-meaning recognition apparatus shown in FIG. 7 can be referred to the method shown in FIG. 1, and details thereof are not described herein again.

Figure 8:
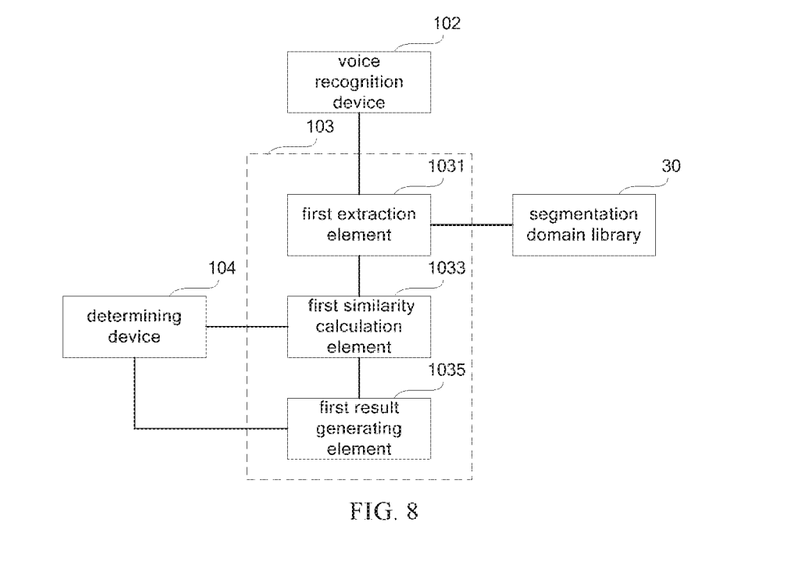
FIG. 8 is a schematic structural diagram of a first recognition device in an implementation of the sentence-meaning recognition apparatus shown in FIG. 7.

FIG. 8 is a schematic structural diagram of a first recognition device in an embodiment of the sentence-meaning recognition apparatus shown in FIG. 7. The sentence-meaning recognition apparatus related to FIG. 8 can correspondingly perform the method shown in FIG. 2.

As shown in FIG. 8, in an embodiment, the first recognition device 103 includes a first extraction element 1031, a first similarity calculation element 1033 and a first result generating element 1035.

The first extraction element 1031 is configured to perform a character-based vectorization processing on the first sentence and the second sentence, respectively, and perform a feature extraction by using the first deep learning model to obtain a first extraction result and a second extraction result.

The first similarity calculation element 1033 is configured to perform a similarity calculation on the first extraction result and the second extraction result to obtain a first similarity.

The first result generating element 1035 is configured to generate a first sentence-meaning recognition result according to the first similarity.

The principle of the sentence-meaning recognition of the sentence-meaning recognition apparatus related to FIG. 8 can be referred to the method shown in FIG. 2, and details thereof are not described herein again.

Figure 9:
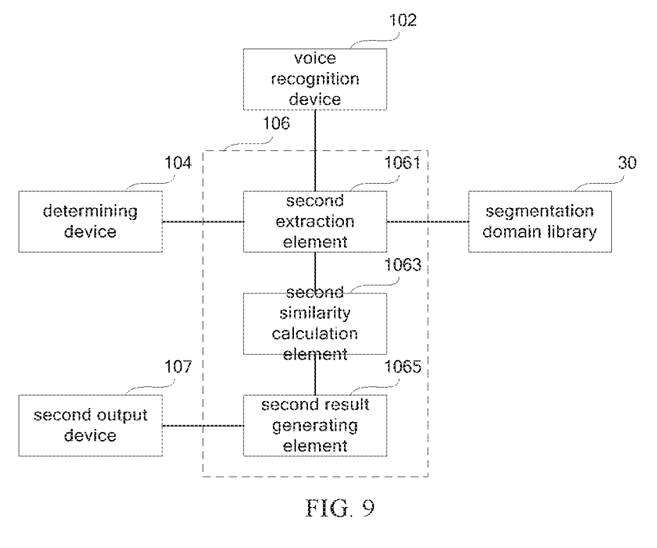
FIG. 9 is a schematic structural diagram of a second recognition device in an implementation of the sentence-meaning recognition apparatus shown in FIG. 7.

FIG. 9 is a schematic structural diagram of a second recognition device in an embodiment of the sentence-meaning recognition apparatus shown in FIG. 7. The sentence-meaning recognition apparatus related to FIG. 9 can correspondingly perform the method shown in FIG. 3.

As shown in FIG. 9, in an embodiment, the second recognition device 106 includes a second extraction element 1061, a second similarity calculation element 1063, and a second result generating element 1065.

The second extraction element 1061 is configured to perform a Chinese-phonetic-alphabet conversion and a Chinese-phonetic-alphabet vectorization processing on the first sentence and the second sentence, respectively, and then perform a feature extraction by using the second deep learning model to obtain a third extraction result and a fourth extraction result.

The second similarity calculation element 1063 is configured to perform a similarity calculation on the third extraction result and the fourth extraction result to obtain a second similarity.

The second result generating element 1065 is configured to generate a second sentence-meaning recognition result according to the second similarity.

The principle of the sentence-meaning recognition of the sentence-meaning recognition apparatus related to FIG. 9 can be referred to the method shown in FIG. 3, and details thereof are not described herein again.

Figure 10:
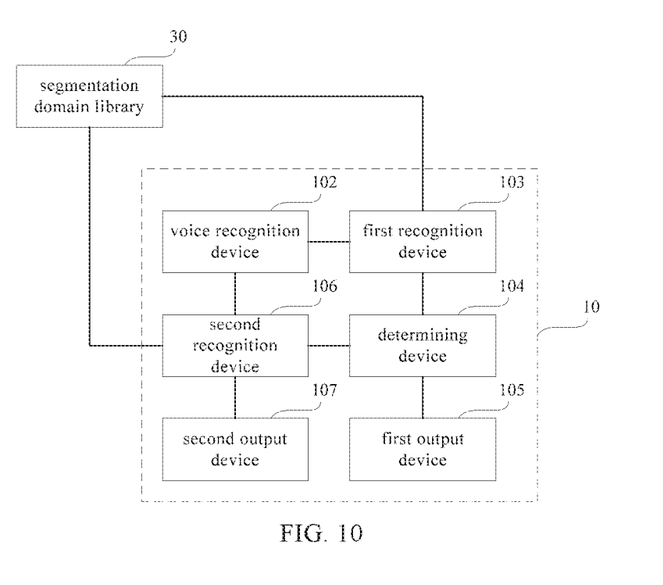
FIG. 10 is a schematic view showing a structure of an implementation of the sentence-meaning recognition apparatus shown in FIG. 7.

FIG. 10 is a schematic view showing the structure of an embodiment of the sentence-meaning recognition apparatus shown in FIG. 7. The sentence-meaning recognition apparatus shown in FIG. 10 can correspondingly perform the method shown in FIG. 5.

As shown in FIG. 10, in an embodiment, the sentence-meaning recognition apparatus 10 further includes a voice recognition device 102 configured to perform a voice recognition on the voice information to obtain the first sentence.

For the principle of sentence recognition of the sentence-meaning recognition apparatus shown in FIG. 10, reference may be made to the method shown in FIG. 5, and details thereof are not described herein again.

Figure 11:
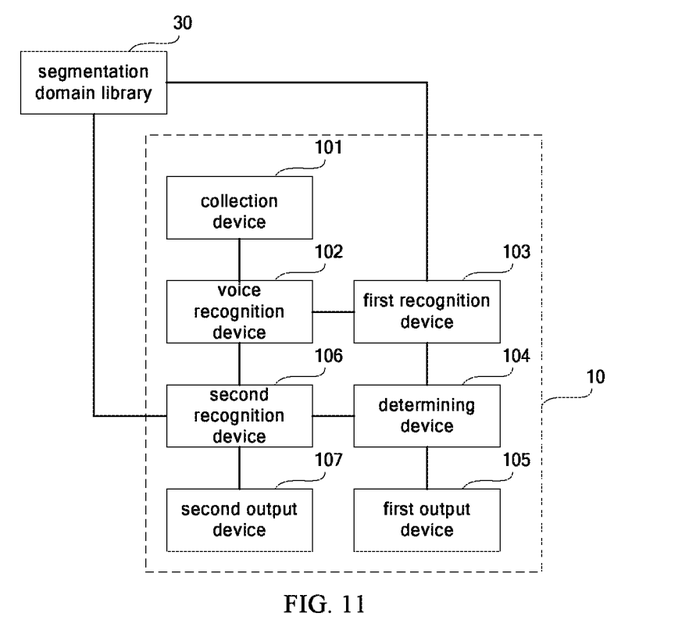
FIG. 11 is a schematic view showing a structure of an implementation of the sentence-meaning recognition apparatus shown in FIG. 10.

FIG. 11 is a schematic view showing a structure of an implementation of the sentence-meaning recognition apparatus shown in FIG. 10. The sentence-meaning recognition apparatus shown in FIG. 11 can correspondingly perform the method shown in FIG. 6.

As shown in FIG. 11, in an embodiment, the sentence-meaning recognition apparatus 10 further includes a collection device 101 configured to collect voice information.

The principle of the sentence recognition of the sentence-meaning recognition apparatus shown in FIG. 11 can be referred to the method shown in FIG. 6, and details thereof are not described herein again.

Figure 12:
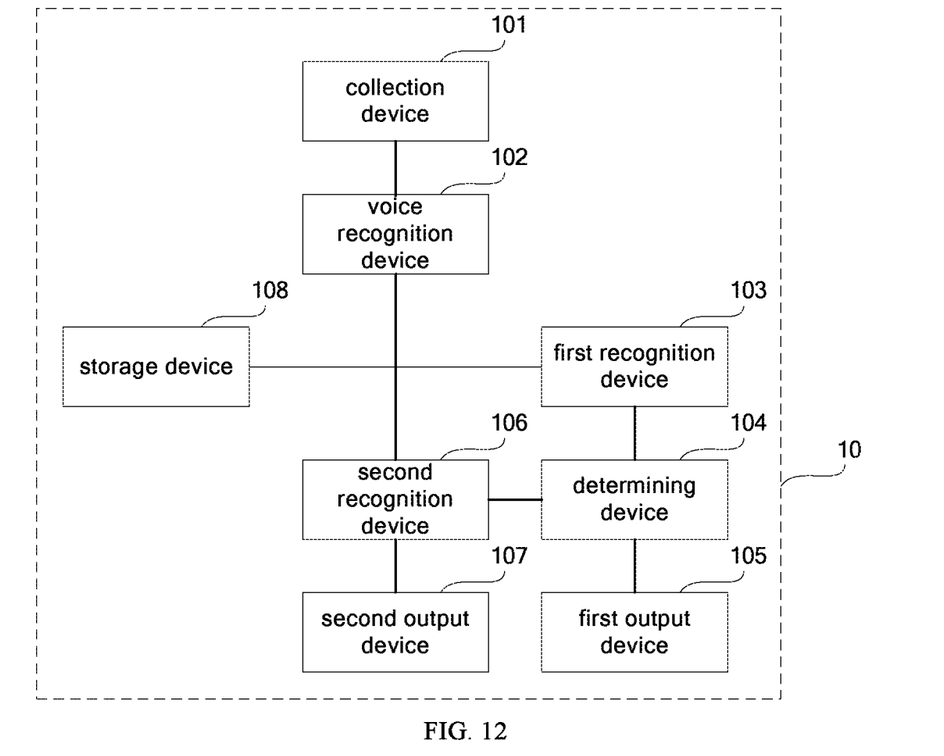
FIG. 12 is a schematic view showing a structure of an implementation of the sentence-meaning recognition apparatus shown in FIG. 7.

FIG. 12 is a schematic view showing a structure of an implementation of the sentence-meaning recognition apparatus shown in FIG. 7. The sentence-meaning recognition apparatus shown in FIG. 12 can also perform the method shown in FIG. 6.

As shown in FIG. 12, in an embodiment, the sentence-meaning recognition apparatus 10 further includes a storage device 108 configured to store a segmentation domain library.

Specifically, the sentence-meaning recognition apparatus shown in FIG. 12 differs from those shown in FIGS. 7-11 in that the segmentation domain library is stored in a local storage device. In the sentence-meaning recognition apparatus shown in FIG. 12, the collection device 101 and the voice recognition device 102 are optional.

Figure 13:
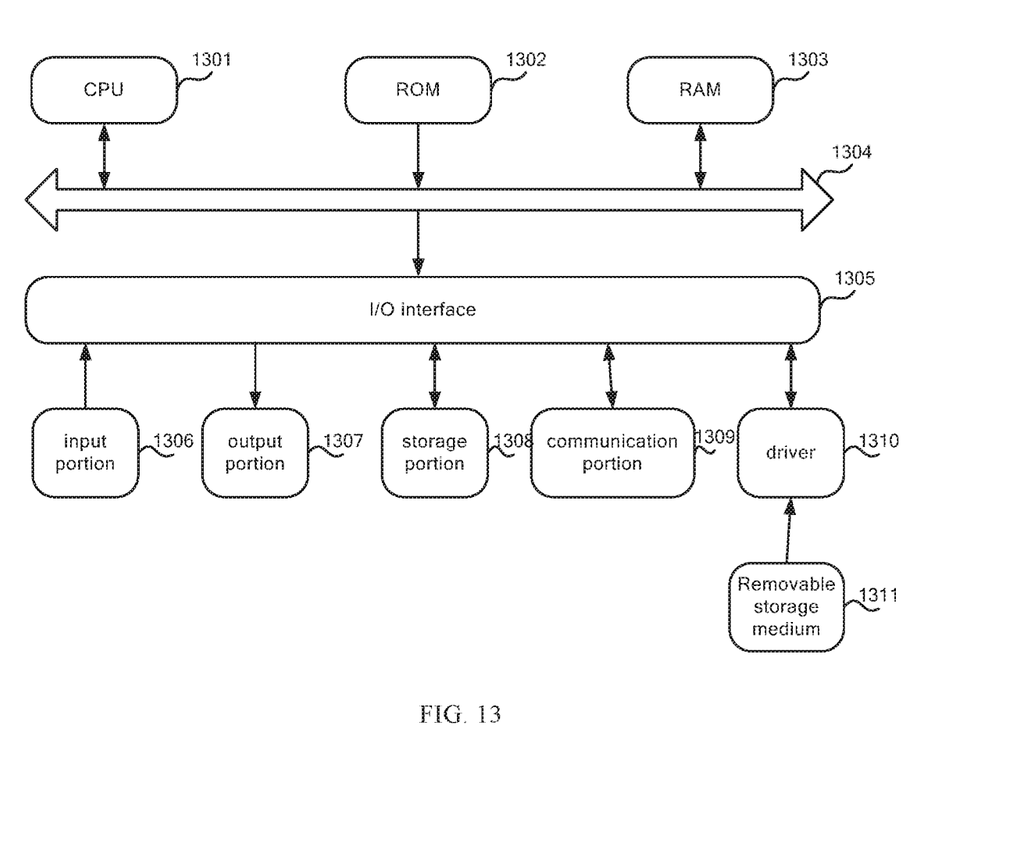
FIG. 13 is a schematic structural diagram of a sentence-meaning recognition equipment according to an embodiment of the present disclosure.

FIG. 13 is a schematic structural diagram of a sentence-meaning recognition equipment according to an embodiment of the present disclosure.

As shown in FIG. 13, as another aspect, the present disclosure also provides a sentence-meaning recognition equipment 1300 including one or more central processing units (CPUs) 1301 which can execute various appropriate operations and processes according to the program stored in a read only memory (ROM) 1302 or the program loaded from the storage device 1308 into the random access memory (RAM) 1303. In the RAM 1303, various programs and data required for the operation of the sentence-meaning recognition equipment 1300 are also stored. The CPU 1301, the ROM 1302, and the RAM 1303 are coupled to each other through a bus 1304. An input/output (I/O) interface 1305 is also coupled to the bus 1304.

The following components are coupled to the I/O interface 1305: an input section 1306 including a keyboard, a mouse, etc.; an output section 1307 including a cathode ray tube (CRT), a liquid crystal display (LCD), a speaker and the like; a storage section 1308 including a hard disk or the like; and a communication section 1309 including a network interface card such as a LAN card, a modem, or the like. The communication section 1309 performs a communication processing via a network such as the Internet. A driver 1310 may also coupled to the I/O interface 1305 as needed. A removable medium 1311 such as a magnetic disk, an optical disk, a magneto-optical disk, a semiconductor memory or the like may be mounted on the driver 1310 as needed so that a computer program read therefrom is installed into the storage section 1308 as needed.

In particular, according to an embodiment of the present disclosure, the sentence-meaning recognition method described in any of the above embodiments may be implemented as a computer software program. For example, an embodiment of the present disclosure includes a computer program product including a computer program tangibly embodied in a machine readable medium, the computer program including program codes for performing a sentence-meaning recognition method. In such an embodiment, the computer program can be downloaded and installed from the network via the communication section 1309, and/or installed from the removable r medium 1311.

In still another aspect, the present disclosure further provides a computer readable storage medium, which may be a computer readable storage medium included in the apparatus of the above embodiment; or may be a computer readable storage medium that exist separately and is not assembled into an apparatus. The computer readable storage medium stores one or more programs that are used by one or more processors to execute the sentence-meaning recognition method described in the present disclosure.

The sentence-meaning recognition method and apparatus, equipment and storage medium provided by the embodiments of the present invention can perform condition-triggered Chinese-phonetic-alphabet-based enhanced recognition on the first sentence to be recognized by configuring a segmentation domain library including a plurality of segmentation domain sentences. Thereby, an accurate recognition in the segmentation domain on a sentence which may be mistakenly recognized by voice recognition is realized, providing the user with a good user experience.

The flowcharts and block diagrams in the Figures illustrate the architecture, functionality, and operation of possible implementations of systems, methods, and computer program products in accordance with various embodiments of the present disclosure. In this regard, each block of the flowchart or block diagram can represent a device, a program segment, or a portion of codes that includes one or more executable instructions for realizing specified logic functions. It should also be noted that in some alternative implementations, the functions indicated in the blocks may also be executed in a different order than the one illustrated in the drawings. For example, two blocks shown in succession may in fact be executed substantially in parallel, and they may sometimes be executed in the reverse order, depending upon the functionality involved. It is also noted that each block of the block diagrams and/or flowcharts, and combinations of blocks in the block diagrams and/or flowcharts, can be implemented by a dedicated hardware-based system that performs the specified functions or operations, or can be implemented by a combination of dedicated hardware and computer instructions.

The devices or elements described in the embodiments of the present disclosure may be implemented by software or by hardware. The described devices or elements may also be provided in the processor. For example, each of the devices may be a software program provided in a computer or a mobile smart apparatus, or may be a separately configured hardware apparatus. The names of these devices or elements do not in any way constitute a limitation to the device or element itself.

The above descriptions only illustrate some embodiments of the present disclosure and explain the principle of the applied technology. It should be understood by those skilled in the art that the scope of the invention disclosed in the present disclosure is not limited to the solutions constituted by specific combinations of the above technical features, and should also cover other solutions constituted by any combinations of the above technical features or equivalent features thereof, for example, solutions constituted by exchanging the above technical features with technical features having similar functions disclosed (but not limited thereto) in the present disclosure, without departing from the concept of the present disclosure.

The invention claimed is:

1. A sentence-meaning recognition method, comprising:
    performing a character-based similarity calculation on a first sentence to be recognized and a second sentence obtained based on the first sentence to obtain a first similarity and a first sentence-meaning recognition result;
    determining whether the first similarity triggers an enhanced recognition according to an enhanced recognition condition;
    outputting the first sentence-meaning recognition result if the enhanced recognition condition is not satisfied, and if the enhanced recognition condition is satisfied, performing a Chinese-phonetic-alphabet-based similarity calculation on the first sentence and the second sentence to obtain a second similarity and a second sentence-meaning recognition result; and
    generating and outputting a third sentence-meaning recognition result according to the first sentence-meaning recognition result and the second sentence-meaning recognition result,
    wherein the step of performing Chinese-phonetic-alphabet-based similarity calculation on the first sentence and the second sentence, to obtain the second similarity and the second sentence-meaning recognition result comprises:
    converting the first sentence and the second sentence into Chinese-phonetic-alphabets and performing a vectorization processing on the obtained Chinese-phoneticalphabets, respectively, and performing feature extraction on the vectorized Chinese-phonetic-alphabets by using a second deep learning model to obtain a third extraction result and a fourth extraction result;

performing a similarity calculation on the third extraction result and the fourth extraction result to obtain the second similarity; and generating the second sentence-meaning recognition result according to the second similarity, and wherein the step of converting the first sentence and the second sentence into Chinese-phonetic-alphabets and performing the vectorization processing on the obtained Chinese-phonetic-alphabets comprises:

converting the first sentence and the second sentence into Chinese-phonetic-alphabets;

dividing the Chinese-phonetic-alphabets of the first sentence and the second sentence into groups on the basis of the Chinese-phonetic-alphabet of each character, and dividing the Chinese-phonetic-alphabets of the first sentence and the second sentence into groups on the basis of a window with a fixed length; and vectorizing the Chinese-phonetic-alphabets of each group.

2. The method of claim 1, wherein the enhanced recognition condition comprises the first similarity being less than a first threshold and greater than a second threshold;

wherein when the first similarity is not greater than the second threshold, the first sentence-meaning recognition result is null.

3. The method of claim 1, wherein the step of performing the character-based similarity calculation on the first sentence to be recognized and the second sentence obtained based on the first sentence to obtain the first similarity and the first sentence-meaning recognition result comprises:

performing a character-vectorization processing on the first sentence and the second sentence respectively, and extracting features from the vectorized first sentence and the vectorized second sentence by using a first deep learning model to obtain a first extraction result and a second extraction result;

performing a similarity calculation on the first extraction result and the second extraction result to obtain the first similarity; and generating the first sentence-meaning recognition result according to the first similarity.

4. The method of claim 3, wherein the step of performing the similarity calculation on the first extraction result and the second extraction result to obtain the first similarity comprises:

performing a similarity calculation on each of second extraction results extracted from multiple second sentences and the first extraction result respectively, to obtain a plurality of candidate similarities; and determining the highest candidate similarity among the candidate similarities as the first similarity.

5. A sentence-meaning recognition method, comprising:
performing a character-based similarity calculation on a first sentence to be recognized and a second sentence obtained based on the first sentence to obtain a first similarity and a first sentence-meaning recognition result;

determining whether the first similarity triggers an enhanced recognition according to an enhanced recognition condition;

outputting the first sentence-meaning recognition result if the enhanced recognition condition is not satisfied, and if the enhanced recognition condition is satisfied, performing a Chinese-phonetic-alphabet-based similarity calculation on the first sentence and the second sentence to obtain a second similarity and a second sentence-meaning recognition result; and generating and outputting a third sentence-meaning recognition result according to the first sentence-meaning recognition result and the second sentence-meaning recognition result wherein the step of generating and outputting the third sentence-meaning recognition result according to the first sentence-meaning recognition result and the second sentence-meaning recognition result comprises:

determining whether the first sentence-meaning recognition result and the second sentence meaning recognition result are the same;

wherein when the first sentence-meaning recognition result and the second sentence meaning recognition result are determined to not be the same, the third sentence-meaning recognition result is configured to be null and is output; and wherein when the first sentence-meaning recognition result and the second sentence meaning recognition result are determined to be the same, the first sentence-meaning recognition result is output as the third sentence meaning recognition result.

6. The method of claim 1, further comprising:
performing a voice recognition on voice information to obtain the first sentence.

7. The method of claim 6, further comprises:
before the step of performing the voice recognition on voice information to obtain the first sentence, collecting the voice information.

8. The method of claim 1, wherein the second sentence is obtained from a segmentation domain library based on the first sentence.

9. A sentence-meaning recognition apparatus, comprising:
a first recognition device that performs a character-based similarity calculation on a first sentence to be recognized and a second sentence obtained based on the first sentence to obtain a first similarity and a first sentence-meaning recognition result;

a determining device that determines whether the first similarity triggers an enhanced recognition according to an enhanced recognition condition;

a first output device that outputs the first sentence-meaning recognition result when the determination result is that the enhanced recognition is not triggered;

a second recognition device that, when the determination result is that the enhanced recognition is triggered, performs a Chinese-phonetic-alphabet-based similarity calculation on the first sentence and the second sentence to obtain a second similarity and a second sentence-meaning recognition result; and a second output device that generates and output a third sentence-meaning recognition result according to the first sentence-meaning recognition result and the second sentence-meaning recognition result, wherein the step of performing Chinese-phonetic-alphabet-based similarity calculation on the first sentence and the second sentence, to obtain the second similarity and the second sentence-meaning recognition result comprises:

converting the first sentence and the second sentence into Chinese-phonetic-alphabets and performing a vectorization processing on the obtained Chinese-phonetic-alphabets, respectively, and performing feature extraction on the vectorized Chinese-phonetic-alphabets by using a second deep learning model to obtain a third extraction result and a fourth extraction result;

performing a similarity calculation on the third extraction result and the fourth extraction result to obtain the second similarity; and generating the second sentence-meaning recognition result according to the second similarity, and wherein the step of converting the first sentence and the second sentence into Chinese-phonetic-alphabets and performing the vectorization processing on the obtained Chinese-phonetic-alphabets comprises:

converting the first sentence and the second sentence into Chinese-phonetic-alphabets;

dividing the Chinese-phonetic-alphabets of the first sentence and the second sentence into groups on the basis of the Chinese-phonetic-alphabet of each character, and dividing the Chinese-phonetic-alphabets of the first sentence and the second sentence into groups on the basis of a window with a fixed length; and vectorizing the Chinese-phonetic-alphabets of each group.

10. The sentence-meaning recognition apparatus of claim 9, wherein the second recognition device comprises:

an extraction element that converts the first sentence and the second sentence into Chinese-phonetic-alphabets and perform a vectorization processing on the obtained Chinese-phonetic-alphabets, respectively, and perform feature extraction on the vectorized Chinese-phonetic-alphabets by using a second deep learning model to obtain a third extraction result and a fourth extraction result;

a calculation element performs a similarity calculation on the third extraction result and the fourth extraction result to obtain the second similarity;

a generation element that generates the second sentence-meaning recognition result according to the second similarity.

11. The sentence-meaning recognition apparatus of claim 10, wherein the extraction element further:

converts the first sentence and the second sentence into Chinese-phonetic-alphabets;

divide the Chinese-phonetic-alphabets of the first sentence and the second sentence into groups on the basis of the Chinese-phonetic-alphabet of each character, and divides the Chinese-phonetic-alphabets of the first sentence and the second sentence into groups on the basis of a window with a fixed length; and vectorizes the Chinese-phonetic-alphabets of each group.

12. The sentence-meaning recognition apparatus of claim 9, wherein the enhanced recognition condition comprises the first similarity being less than a first threshold and greater than a second threshold;

wherein when the first similarity is not greater than the second threshold, the first sentence-meaning recognition result is null.

13. The sentence-meaning recognition apparatus of claim 9, further comprising:

a voice recognition device configured to perform a voice recognition on voice information to obtain the first sentence.

14. The sentence-meaning recognition apparatus of claim 12, further comprising:

a voice recognition device that performs a voice recognition on voice information to obtain the first sentence.

15. The sentence-meaning recognition apparatus of claim 13, further comprising: a collection device that collects the voice information.

16. The sentence-meaning recognition apparatus of claim 9, further comprising:

a storage device that stores a segmentation domain library, wherein the second sentence is obtained from the segmentation domain library based on the first sentence.

17. A sentence-meaning recognition equipment, comprising:

one or more processors;

a memory that stores one or more programs, wherein the one or more processors perform the method of claim 1 when the one or more programs are executed by the one or more processors.

18. A non-transitory storage medium storing a computer program, wherein the computer program is executed to implement the method of A sentence-meaning recognition method, comprising:

performing a character-based similarity calculation on a first sentence to be recognized and a second sentence obtained based on the first sentence to obtain a first similarity and a first sentence-meaning recognition result;

determining whether the first similarity triggers an enhanced recognition according to an enhanced recognition condition;

outputting the first sentence-meaning recognition result if the enhanced recognition condition is not satisfied, and if the enhanced recognition condition is satisfied, performing a Chinese-phonetic-alphabet-based similarity calculation on the first sentence and the second sentence to obtain a second similarity and a second sentence-meaning recognition result; and generating and outputting a third sentence-meaning recognition result according to the first sentence-meaning recognition result and the second sentence-meaning recognition result, wherein the step of performing Chinese-phonetic-alphabet-based similarity calculation on the first sentence and the second sentence, to obtain the second similarity and the second sentence-meaning recognition result comprises:

converting the first sentence and the second sentence into Chinese-phonetic-alphabets and performing a vectorization processing on the obtained Chinese-phonetic-alphabets, respectively, and performing feature extraction on the vectorized Chinese-phonetic-alphabets by using a second deep learning model to obtain a third extraction result and a fourth extraction result;

performing a similarity calculation on the third extraction result and the fourth extraction result to obtain the second similarity; and generating the second sentence-meaning recognition result according to the second similarity, and wherein the step of converting the first sentence and the second sentence into Chinese-phonetic-alphabets and performing the vectorization processing on the obtained Chinese-phonetic-alphabets comprises:

converting the first sentence and the second sentence into Chinese-phonetic-alphabets;

dividing the Chinese-phonetic-alphabets of the first sentence and the second sentence into groups on the basis of the Chinese-phonetic-alphabet of each character, and dividing the Chinese-phonetic-alphabets of the first sentence and the second sentence into groups on the basis of a window with a fixed length; and vectorizing the Chinese-phonetic-alphabets of each group.

19. The method of claim 5, wherein the enhanced recognition condition comprises the first similarity being less than a first threshold and greater than a second threshold;

wherein when the first similarity is not greater than the second threshold, the first sentence-meaning recognition result is null.

20. The method of claim 5, wherein the step of performing the character-based similarity calculation on the first sentence to be recognized and the second sentence obtained based on the first sentence to obtain the first similarity and the first sentence-meaning recognition result comprises:

performing a character-vectorization processing on the first sentence and the second sentence respectively, and extracting features from the vectorized first sentence and the vectorized second sentence by using a first deep learning model to obtain a first extraction result and a second extraction result;

performing a similarity calculation on the first extraction result and the second extraction result to obtain the first similarity; and generating the first sentence-meaning recognition result according to the first similarity.

21. The method of claim 20, wherein the step of performing the similarity calculation on the first extraction result and the second extraction result to obtain the first similarity comprises:

performing a similarity calculation on each of second extraction results extracted from multiple second sentences and the first extraction result respectively, to obtain a plurality of candidate similarities; and determining the highest candidate similarity among the candidate similarities as the first similarity.

22. The method of claim 5, further comprising:

performing a voice recognition on voice information to obtain the first sentence.

23. The method of claim 22, further comprises:

before the step of performing the voice recognition on voice information to obtain the first sentence, collecting the voice information.

24. The method of claim 5, wherein the second sentence is obtained from a segmentation domain library based on the first sentence.

* * * * *